United States Patent [19]
Singh

[11] Patent Number: 5,832,005
[45] Date of Patent: Nov. 3, 1998

[54] FAULT-TOLERANT METHOD AND MEANS FOR MANAGING ACCESS TO AN INITIAL PROGRAM LOAD STORED IN READ-ONLY MEMORY OR THE LIKE

[75] Inventor: Shanker Singh, Morgan Hill, Calif.

[73] Assignee: International Business Machines Corporation, Armonk, N.Y.

[21] Appl. No.: 989,058

[22] Filed: Dec. 11, 1997

[51] Int. Cl.[6] .............................. G11C 29/00; G11C 8/00
[52] U.S. Cl. ....................................... 371/51.1; 365/230.1
[58] Field of Search ........................... 371/21.1, 48, 49.1, 371/51.1, 40.11; 365/230.01, 236, 200, 201; 711/102, 103, 104, 105

[56] References Cited

U.S. PATENT DOCUMENTS 4,531,213  7/1985  Scheuneman ............................. 371/3
4,920,538  4/1990  Chan et al. ........................ 395/183.143
5,345,582  9/1994  Tsuchiya ................................ 371/51.1
5,535,162  7/1996  Uenoyana ................................ 365/200

*Primary Examiner*—Trinh L. Tu
*Attorney, Agent, or Firm*—R. Bruce Brodie

[57] ABSTRACT

A method and means in a stored, program-controlled machine to maintain an uninterrupted access and copying of simple parity-coded words of an initial program load (IPL) or other software from a read-only memory or a memory with limited rewrite capability in the presence of detectable errors, erasures, or faults. The method utilizes detected parity error in a word copied out from storage to modify the address register to seek the same word from a mirror address of an image copy of the IPL. The image copy is stored at a second range of consecutive memory address nonintersecting and symmetric with the address range of the original IPL. The IPL is then accessed in the second address range until either another parity error causes a switch back to the original IPL or the program terminates.

16 Claims, 3 Drawing Sheets

WRITABLE CONTROL STORE

WRITABLE CONTROL STORE

CONTROL FLOW FOR PARITY ERROR-SWITCHED MEMORY
ACCESSING OF IPL-STORED INSTRUCTIONS
OR IMAGE COPIES THEREOF

FAULT-TOLERANT METHOD AND MEANS FOR MANAGING ACCESS TO AN INITIAL PROGRAM LOAD STORED IN READ-ONLY MEMORY OR THE LIKE

FIELD OF THE INVENTION

This invention relates to methods and means for memory management, and more particularly to the management of a Read-Only Memory (ROM) or memories with limited rewrite capability (PROM, EPROM, Flash) and the like when accessing an initial program load (IPL) or other software from the ROM under conditions of detectable cell memory error or erasure.

DESCRIPTION OF RELATED ART

In this specification, reference is made to direct access storage devices (DASDs) such as disk drives in which information is recorded or copied in a bit serial fashion, and to random access memories or devices in which information is recorded or copied in multibit-at-a-time or parallel fashion. For purposes of this invention, the width of a fixed number of bits at a time written into or copied from the memories will be defined as a "word". Thus, reference may be made to "word-organized" memory and the like, and this would contemplate memories organized on a cognizable byte or other basis.

Recursive Nature of Processing and Storage Functions

In the prior art, it is well appreciated that digital, stored, program-controlled machines and devices largely process serial streams of data. They have been organized on Von-Neumann architecture and comprise several standard elements. These include a memory for storing programs and data, a program decoder for extracting program words and data from the memory and for using the words to partially process the data, a plurality of input and output devices, and a communications mechanism therebetween.

Two trends have emerged over the decades. First, economies of scale and performance have resulted in centralization and hierarchical organization of memory and storage, while sophisticated processing is sufficiently inexpensive to distribute locally. This means that bulk storage devices, such as disks and tapes, are the sources and sinks of datastreams. However, the datastreams sent to and received from these storage devices are themselves set up and handled by a significant number of local processors.

Illustratively, in a high-density, multitracked disk drive, a first processor with a local memory, responsive to external instructions, sets up a buffered read or write path to data on the disk. The set up of the access path involves a second processor for regulating the servo positioning of the head over the target disk track. When data is streamed onto the disk in the write path, a third processor maps data words into words of a linear error correction code (ECC) prior to recording. Lastly, when data is streamed from a disk in the read path, a fourth processor ascertains whether any errors or erasures have occurred, corrects said errors and erasures, and maps the ECC codewords into data words.

Reestablishing an Operating State When Powering a System or Device On

Systems and devices are periodically turned on and off for a variety of reasons including saving on wear and tear of the device or system, saving of energy costs, maintenance and repair, reprogramming, etc. When such systems or devices are turned back on, it is desired to place them either in a well-defined default information and control state or in a state existing just prior to the system or device being turned off.

As a system or device is first powered back on, it is necessary for a system or device to (1) condition various of its functions, (2) perform self tests and make adjustments, and (3) provide indication of status. For stored, program-controlled systems and devices, these initial power-on activities have been variously termed "self-configuration and testing" or the like.

The control and data flow of most programmable systems and devices is determined by resident software called an "operating system" (OS). An OS defines the "personality" of the machine and is responsible for most housekeeping operations, including that of power up and power down. Within a device, the local OS is also termed a "control process". Relatedly, the portion of the OS responsible for power up is called the "initial program load" or IPL.

IPL and Accessing Reliable Storage

The IPL is a sequence expressed as software and canned as a microcode load or firmware. It constitutes an initialization procedure that causes an OS to commence operations. In large systems, IPL loads system programs from disk or tape storage, configures the system, and provides a level of internal function test. At the device level, it performs the same tasks on a specialized basis.

The IPL necessarily must be stored in a highly reliable, preferably tamper-proof, high-speed storage medium. Although writable magnetic media are reliable, they are susceptible to error or erasure by stray or induced magnetic fields and noise. It is the current practice to store IPLs in electronic semiconductor memory fashioned as Write-Once-Read-Many devices (WORMs). These are also called read-only memories (ROMs).

All forms of electronic semiconductor memories have access times of a few nanoseconds. They are all impervious to change from stray magnetic fields and the like. They are expressed in a bewildering variety of electric field-oriented semiconductor design and fabrication technologies such as Bipolar, cMOS, nMOS, pMOS, etc. Their logical utility varies as to whether they are bulk writable at all, and whether they may be rewritten at the factory only or in the field. For instance, a programmable ROM (PROM) is bulk rewritable in the field only once. The bulk rewrite is performed by a device external to the computing system. An EPROM is a PROM rewritable several times in the field using an ultraviolet light source external to the system. An EEPROM is an EPROM bulk rewritable in the field by an electric field means.

Flash memory technology combines the best of both electric and magnetic field memories. That is, flash memory provides nanosecond nonvolatile access to stored data as are provided by ROMs. While flash memory is very competitive, it nevertheless is a read-mostly/write-infrequently form of electronic storage and is very expensive. Currently, flash memory retails in the range of $50/megabyte, while magnetic disk storage retails for less than $1/megabyte. The flash memories or the like are word organized in one or two bytes in width with a storage capacity ranging from 1 to 64 megabytes. This means that flash memory is used in circumstances requiring high availability, such as that of providing memory-stored IPL instructions and data in the stored, program-controlled process of powering a system or device on.

Defects and Errors in Control Memory and Wild Branching

Any magnetic or semiconductor memory medium is manufactured containing some proportion of defects. Where these are identified at the factory and marked, they can be avoided by using a system or device in the field. As the memory medium is stressed through usage and shear passage of time, additional defects may appear periodically or randomly. The defects may cluster in a range of contiguous cells, or be distributed as if memory were a sparse matrix.

Errors in memory addressing or errors in stored instructions or data caused by cell defects can result in wild branching when executed by an accessing processor. This form of branching results in unpredictable system or device performance. A complex approach to controlling wild branching is exemplified in Chan et al., U.S. Pat. No. 4,920,538, "Method of Checking the Execution of Microcode Sequences", issued Apr. 24, 1990. Chan teaches a method for detecting a wild branch in a microcode sequence by ascertaining a weighted address limit for each branch at compile time and ascertaining whether each branch at run time is within the a' priori range.

Redundancy and Points of Failure

Contemporary computing and storage subsystems such as the IBM RAMAC include significant software, hardware, and data redundancy to avoid partial or total system unavailability as a function of a single point of failure. Thus, data and parity blocks are spread among several disk drives of a RAID 5 array in a pattern permitting the storage subsystem to continue to function, notwithstanding failure of a single drive. In that case, missing data can be recomputed from the data stored on the remaining drives. However, any cell failure in the repeated referencing of flash memory or the like during the IPL process or any failure in the memory address register and its modification logic constitutes a single point of failure to the entire storage subsystem or device.

Bit-level Redundancy and Hamming Codes

It is known in the prior art that data redundancy can be used to detect and correct data errors or erasures arising out of cell failure in codewords. A simple parity code can detect the presence of either an odd number or an even number of errors. Even more protection can be provided by a Hamming code. This code is a class of linear block error correction codes of n bits in length of which k<n bits contain information and (n–k) bits are redundant. The Hamming code is characterized by a structure that for (n, k) bits:

$$(n,k)=(2^m-1, 2^m-1-m), m=2,3,4.$$

These codes have a minimum distance of 3. In general, the error correcting ability t of a code having a minimum distance d between words is defined as the guaranteed maximum correctable errors per codeword as expressed as:

$$t = \frac{(d-1)}{2}$$

The Hamming codes are thus able to detect and correct all single-bit errors or detect all combinations of two or fewer errors within a block. There are several problems with the use of Hamming codes. These include (1) assigning a significant amount of the code capacity of each word to redundancy, (2) on-the-fly syndrome detection and correction of errors, and (3) signal indication where the errors or erasures exceed the correction capability of the code. It is the case that where defects cluster in a memory medium, the Hamming code correction capacity on a word basis may be readily exceeded.

SUMMARY OF THE INVENTION

It is accordingly an object of this invention to devise a method and means in a stored, program-controlled machine to maintain an uninterrupted access and copying of words of an initial program load (IPL) or other software from a read-only memory or a memory with limited rewrite capability in the presence of detectable errors, erasures, or faults.

It is yet another object that such method and means treat error or erasure as a cluster of single error-at-a-time events so that the IPL or other program extraction and execution process from the memory may continue, notwithstanding the fact that the errors or erasures may exceed the detection or correction capacity in codewords stored in the memory.

The foregoing objects are believed satisfied by a method and means for maintaining an uninterrupted initial program load (IPL) or other software execution, even in the presence of detectable bit failures in the IPL read-only memory codeword locations. The method requires that simple parity-coded words of the IPL be written into a first range of ROM addresses, and at least one IPL image be written into a second range of ROM addresses mutually exclusive of the first address range. When a system or device is initially powered on, the words of the IPL are read out from the memory over a predetermined address traverse in the first range of addresses. Each codeword is parity tested upon being memory accessed. If a parity error is not sensed, then the word is written out to a programming-responsive device such as a disk controller. The process is repeated by extracting the instruction at the next address in the same address range. The next address is either the address or offset contained in the present instruction, or as modified by the default action of the memory address register and logic. This extractive process continues ad seriatim to program termination.

Significantly, if a parity error is sensed in the word extracted at the $j^{th}$ address, then the memory address register contents are modified to that of the mirror location nj in the second address range for that codeword access. In this case, the next address would be nj+k, and the default succession would be nj+2k, nj+3k, . . . , nj+Nk, where k is the default increment provided by the memory address logic and N is the terminating address for the traverse. In the event that another parity error was detected at nj+qk while traversing the range of second addresses, the memory address register contents could again be modified to return to an address j+qk in the first range. In that case, the memory address of the next IPL word would be j+(q+1)k, and the default succession would be j+(q+2)k, j+(q+3)k, . . . , j+(q+N)k.

In the event that multiple memory errors should cluster in a given range of addresses, then the method and means are modified to switch to access instructions or the like from the mirror address in the first copy or second copy. This occurs upon detection of the first parity error. The traverse is then switched and continues in the copy addresses until program termination. Upon detection of a parity error while accessing instructions or the like from the copy addresses, the method and means can return to accessing instructions from the mirror address in the first address range. The method can alternatively branch to a second copy located in yet another mutually exclusive address range of the memory. The accessing of the addresses would continue in the transferred-to address range until program termination or detection of another parity error.

The method and means contemplate parity error-switched memory accessing of IPL copies or other software stored in mutually exclusive address ranges of the same ROM or the like. It further contemplates that the accessing traverse ordinarily continues within the transferred-to copy. However, the accessing would be switched yet again on the same basis upon error detection. The only constraints to the method and means are that: (1) ROM memory or the like has sufficient capacity to store at least one IPL and its image in mutually exclusive address ranges, and (2) occurrence of any memory error, erasure, or fault be detectable by a simple redundancy code whether or not the errors are clustered.

DESCRIPTION OF THE PREFERRED EMBODIMENT

Figure 1:
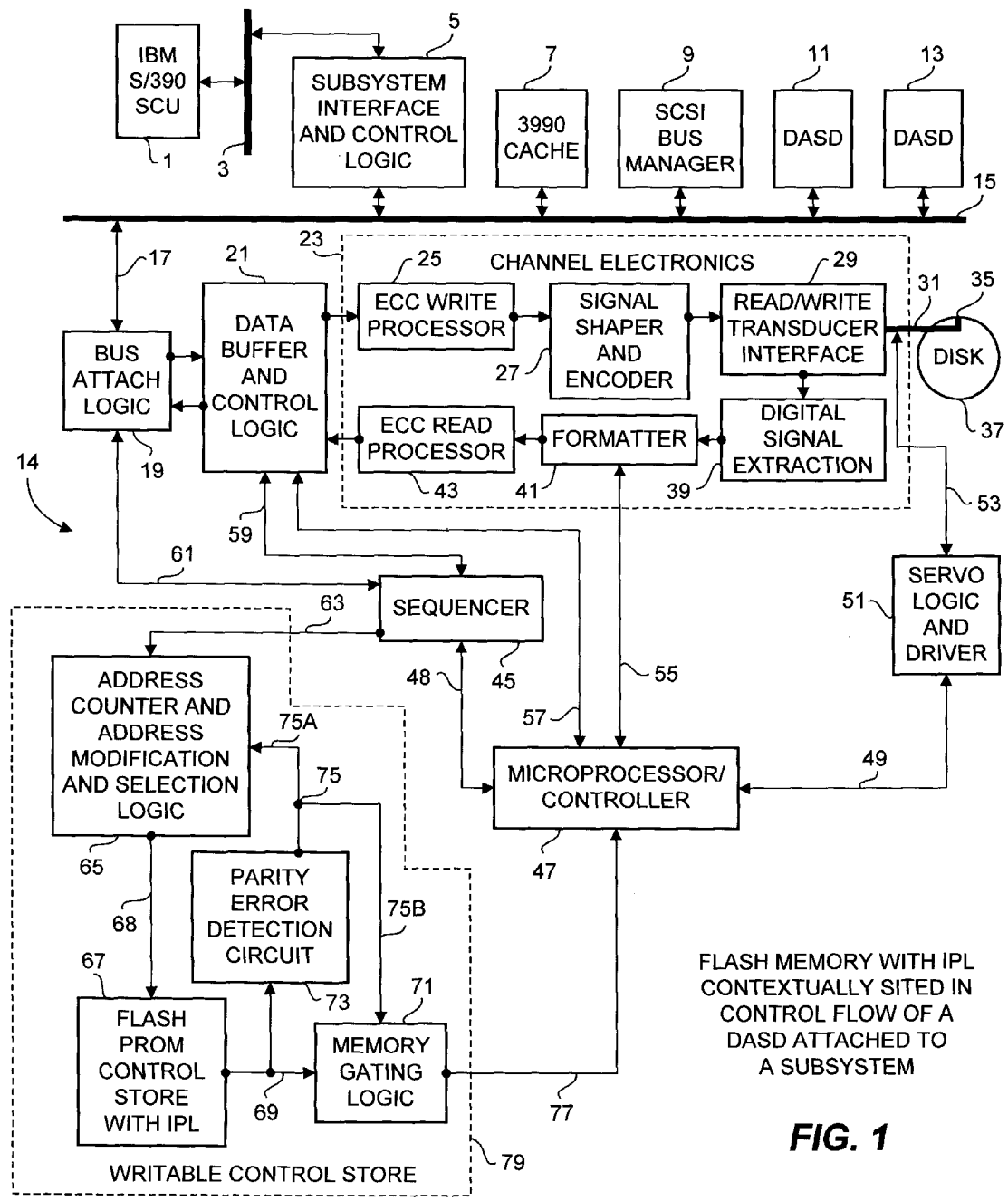
FIG. 1 shows a writable control store in the form of a flash memory according to the invention storing an IPL and its image contextually sited in the control flow of a DASD attached to a storage subsystem.

Referring now to FIG. 1, there is shown a writable control store 79 in the form of a flash memory 67 according to the invention storing an IPL and its image contextually sited in the control flow of a DASD attached to a storage subsystem. The following paragraphs are directed to a brief explanation of the subsystem and disk device operation as a context for appreciating the method and means of the invention.
Operational Context of the CPU Storage Subsystem, and Disk Drives Illustratively, this invention arises in the context of a large mainframe multitasking, multiprogramming computer with attached storage. In this regard, a CPU 1, such as an IBM S/390, executes several applications concurrently. Each application from time to time will either modify information ultimately stored outboard of the CPU 1 or request information not stored in its main memory. These read and write requests are conveyed by a series of commands, virtual addresses, and data to a disk storage subsystem. The pathway includes a bus 3 to a subsystem interface and control logic 5. In the case of a read request, the subsystem logic 5 will first ascertain whether the records are stored within the subsystem cache 9. If it is, the logic 5 will cause the records to be staged up to the host 1 and that will terminate the operation.

If the records to be read by CPU 1 are not available in the subsystem cache 9, then the subsystem logic 5 will determine the disk location and send the request in the form of several accessing and operations commands to one of the disk drive units 11, 13, or 14 over SCSI bus 15. A bus master 9 regulates all access to the bus. When a drive becomes available, such as drive 14, and has been selected, the bus master 9 attaches it to bus 15. The selected disk drive 14 will then receive commands and streams of data through bus attachment logic 19. Commands are specially coded and sent to the microprocessor/controller 47 over a path including path 61, sequencer 45, and path 48. The controller 47 interprets the commands. For instance, the controller 47 will interpret all access commands by actuating the servo logic and driver 51 for dispatching or repositioning the arm 31 and the attached read/write head 35 over the addressed track on the cyclically rotating disk 37. The actuation will include sending the necessary address information to the servo 51.

In the case of a write request, the controller 47 will enable any streamed data to be placed in a series of contiguous locations in a double or circular buffer 21 by activating control path 57. This will initiate a synchronous operation for streaming the data from the buffer 21, error and channel encoding the data, and then recording it to the disk 37. In this regard, the channel electronics will in effect constitute a write processing path including ECC processor 25, signal shaper and encoder 27, an interface transducer, and the head 35 to the disk 37.

In the case of a read request, the controller 47 will enable any data streamed from the disk 37 to be written into contiguous locations in the buffer 21 also by activating control path 57. This will initiate a synchronous operation in the channel electronics for processing the recorded information by channel decoding it, testing the bit streams for errors, correcting them on the fly, and writing the clean and corrected data into the buffer. This occurs over a path defined by transducer 29, signal extractor 39, formatter 41, and ECC processor 43.
Structural Aspects of the Sequencer, Writable Control Store, IPL, and Error Occurrence Within the Drive Each disk drive also includes a sequencer 45 and a writable control store (WCS) 79. The WCS is initiated by a signal from the sequencer over path 63. The output from the WCS in the form of commands and other control operands is provided to the controller 47 over path 77.

The sequencer 45 functions as a lower-level finite state machine or processor for regulating the control and data flows to and from the channel electronics 23, the buffer 21, the attachment interface 19, and the controller 47. The operating system of the drive is contained in the WCS 47 and includes all of the routines necessary to interpret external commands and access the storage medium, and process the data flows to and from the disk and to and from the device interface. Additionally, the drive operating system includes software error correction and an initial program load (IPL).

The WCS 79 preferably comprises a flash memory 67, a memory address counter and modification logic arrangement 65 coupling the memory over path 66, a parity detection circuit 67 responsive to any word access by the address counter 65, and coupling the counter 65 and memory gating logic 71. As discussed supra, a flash memory 67 is a species of very high-speed electronic, semiconductor, nonvolatile PROM that is word organized. The size of the addressable words is in terms of bytes. In this regard, when a system utilizing a flash memory is powered down, the contents of the PROM remain invariant. That is, it can be accessed immediately upon applying power to the system or device.

As further discussed supra, the IPL is critical in reestablishing a powered-on operating state from either a suspended or powered-off state of any stored, program-controlled system, including that of a disk drive and storage subsystem. Preferably, the IPL should occupy only a modest fraction of the flash memory. That is, for an IPL of N codewords, the memory should at least have the capacity to store 2N words. This enables one or more copies to be written into the memory for use by the method and means of the invention. Also, it avoids the costs and complexities attendant with any multimodule function. In the system of this invention, memory 67 includes an original and at least one copy of the IPL. Significantly, the original IPL and its image should be stored in mutually exclusive and nonoverlapping address ranges within the memory 67. This avoids any likelihood that a cluster of memory defects could corrupt both copies. Second, each word written into IPL and its image is simply odd parity coded. This is for the purpose of detecting the most likely error event, that of single-bit error, erasure, or fault. operation of the Control Store and IPL Upon Device Power On or the Like Operationally, when disk drive 14 is in a powered-off state, the head 35 and arms 31 are parked in a predetermined location on the disk 37. When the device becomes energized, sequencer 45 activates WCS 79 by signaling over path 63. This signal is sent to the counter 65. The contents of counter 65 are set by this signal. In turn, this serves as the starting address to memory 67 over path 66. Responsive to an application of address signals, the memory 67 copies out the bit content of the addressed word plus its parity on path 69. This is applied concurrently to memory gating logic 71 and the parity error detector circuit 73. If the parity detector 73 does not sense an error, then memory gate logic 71 is not inhibited, the address counter 65 is incremented, and the contents of the memory are passed to the controller 47 over path 77. This process is repeated without exception.

Ordinarily, address counters consistently use a default increment or decrement interval of either a constant k=+1 or k=1. If the N words constituting the IPL were stored in consecutive locations in memory in a first address range from a, a+1, a+2, a+N-1, then the N words constituting the image copy of the IPL should be stored in a mutually exclusive address range b, b+1, b+2, . . . , b+N-1 such as would pertain where $$a<(a+1)<\ldots<(a+N-1)<b<(b+1)<\ldots<(b+N-1).$$

It is possible to interleave addresses and have a default increment of k>1. However, as previously pointed out, the chances of damaging two IPL runs where errors locally cluster are reduced where the address ranges are mutually exclusive and nonintersecting.

Operation of the Control Store and IPL in the Presence of Error

Figure 2:
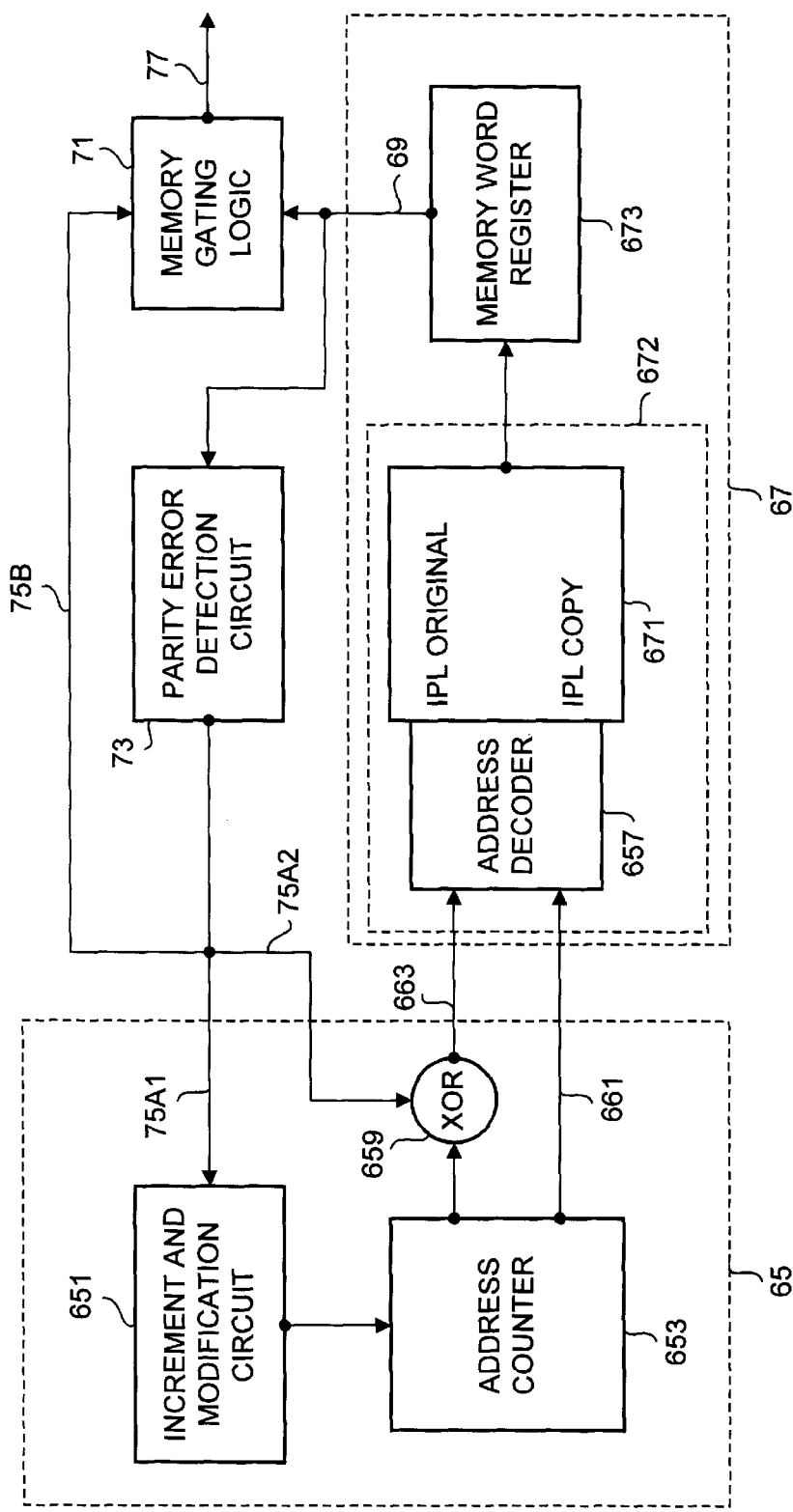
FIG. 2 depicts a logical implementation of the writable control store wherein the flash memory address logic has been made parity error responsive according to the invention.

Referring now to FIG. 2, there is shown a logical implementation of the WCS 79 wherein the flash memory address logic 65 has been made parity error responsive according to the invention. The flash memory PROM 67 includes the semiconductive storage medium 671 and an address decoder 657 in a pluggable package 672. In this regard, the decoder 657 is responsive to the contents of the address counter 653 for causing a multibit word stored at that address to be copied out to an associated memory word register 673. WCS 67 also includes a parity error detection circuit 73 responsive to the contents of register 673.

Since the words written into the memory 673 are simple parity, then the parity detection by circuit 73 can be implemented in a variety of ways. One implementation includes resettable counter/divider logic. Thus, odd parity error would be indicated for the presence of an even number of 1's in an extracted word from memory 671. In contrast, a no-error condition is satisfied by an odd number of 1's. For control purposes, a binary 1 concurrently applied to paths 75A1, 75A2, and 75B can indicate a parity error by circuit 73.

The WCS provides IPL word outputs to the controller 47 over a gated path 77. However, when a parity error indication is applied to path 75B, a memory gating and inhibiting logic circuit 71 prevents the contents of register 673 from being written out. Also, any parity error indication is applied o as one input to an exclusive OR gate (XOR) 659 located in path 663 of the highest address bit position between address counter 653 and the memory address decoder 657. The other lower address bit positions are figuratively indicated on path bundle 661.

If a parity error were detected in register 673 contents by circuit 73 for contents copied out of memory address 0100111, then the binary 1 parity error signal applied to XOR 659 over path 75A2 would cause the address to be applied to the decoder 657 to be 1100111. Similarly, the contents of the address counter would be set to 1100111 such that upon being incremented, the next address to be accessed would be 1100111+1=1101000 and the address after that would be 1101001, etc.

In the event that a parity error were encountered while traversing successive addresses in the IPL copy, such as 1110101, then a parity error indication of binary 1 would be applied to XOR 659, while the highest address bit in the counter 653 was a binary 1 would be applied to the decoder 657 as a binary 0. That is, the address applied to the decoder would be the mirror address in the original IPL at location 0110101. The contents of this address would be copied to register 673 and gated out to path 77 to the controller 47. The counter 653 would be reset to 0110101 and incremented by a binary 1 so that the next address to be applied to the decoder would be 0110101+1=0110110 and the address after that would be 0110111, etc.

It should be apparent that many different mirror mappings can be used. In this embodiment, the IPL codeword sequence could start at flash memory address 0000000 while image IPL copy could start at address 1000000. This requires that the mappings be both one-to-one and onto, as well as nonintersecting. The separate address ranges for the IPL and its image are figuratively shown in FIG. 2 memory 671.

Figure 3:
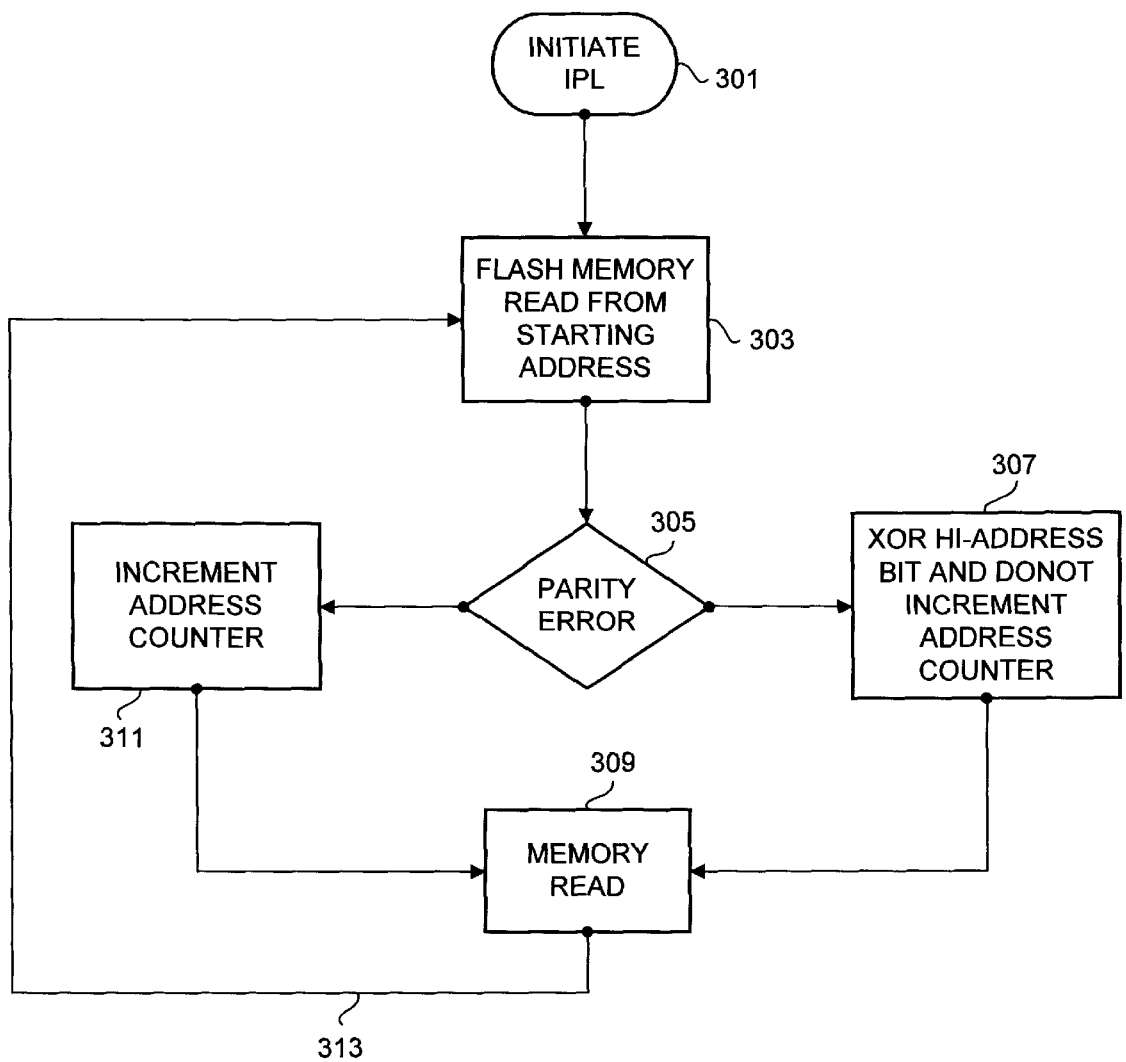
FIG. 3 sets out a control flow of the method of the invention.

Referring now to FIG. 3, there is shown a control flow of the method of the invention. With the advent of power on in step 301, the sequencer 45 applies a signal to the WCS which sets counter 653 to a starting address as depicted in step 303. When the word from the counterpart location is copied out to the register 673, it is parity tested by circuit 73 in step 305. In the absence of parity error, the address counter 653 is incremented in step 311, the contents of the register 673 are written out to path 77 through gate 71 in step 309, and the process repeated for the next access over route 313. In the presence of parity error, the high address bit into the memory decoder 657 is XORed with a binary parity error signal and the access flipped to the location of the desired word but located in a mirror address as expressed in step 307. These contents are extracted and tested and, if error free, the word is sent out. Significantly, the next address is the next consecutive location in the copy of the IPL.

While the invention has been described with respect to an illustrative embodiment thereof, it will be understood that various changes may be made in the method and means herein described without departing from the scope and teaching of the invention. Accordingly the described embodiment is to be considered merely exemplary, and the invention is not to be limited except as specified in the attached claims.

What is claimed is:

1. A method for managing a read-only, word-addressable memory of at least 2N word capacity accessed under control of a register, said memory and register coupling a program responsive computing means, said memory being operative in the presence of detectable bit failures including locally clustered bit failures, said memory storing a sequence of N simple parity-coded words of an initial program load (IPL) in a first range of N memory addresses, said sequence of codewords being accessed responsive to a succession of operands applied to the register, comprising the steps of:

(a) storing in said memory at least one image of the IPL in a second range of N addresses mutually exclusive of the first address range;

(b) responsive to each operand being applied to the register, copying the codeword from the memory at the location defined by the operand and ascertaining the parity condition of said copied codeword;

(c) in the absence of a parity error, writing said copied codeword out to the computing means and incrementing the register by a predetermined magnitude to another location in the first address range and repeating steps (b) and (c) ad seriatim until program termination; and (d) in the presence of parity error, modifying the register operand utilizing the parity error indication and accessing the codeword from a mirror address defined by the modified operand in the second range of addresses and repeating steps (b) and (c) in the switched-to address range until either another parity error is detected or the accessing traverse of the IPL from the memory is completed.

2. The method according to claim 1, wherein in step (d) the address of the next IPL word after accessing the word at the location defined by the modified operand is an address selected from the set consisting of j+ increment in the first address range or nj+ increment in the second address range, n being a constant predetermined integer value.

3. The method according to claim 1, wherein the N words constituting the IPL are stored in consecutive locations in memory in a first address range from a, a+1, a+2, . . . , a+N−1, and wherein the step (a) of storing at least one image copy of the IPL further includes the step of storing the N words constituting said image copy in a second address range b, b+1, b+2, . . . , b+N−1, said second address range being mutually exclusive of the first such that $$a<(a+1)<\ldots<(a+N-1)<b<(b+1)<\ldots<(b+N-1).$$

4. The method according to claim 1, wherein the first and second range of addresses are mirrored in that they are binarily symmetric with each other, and further wherein the modification of the register operand utilizing the parity error indication further includes the step of logically combining the most significant binary digit (MSD) of the operand in the register and the parity error indication, thereby causing access to be made of the mirrored location in the other address range.

5. The method according to claim 4, wherein the step of logically combining the parity error indication and the MSD is one selected from the set consisting of logical "OR", exclusive "OR", and a logical "AND".

6. A method for managing a word-organized, random accessed memory (RAM) of at least 2N word capacity in a read-only mode, said memory coupling a program-executing device, said read-only mode RAM being controlled by an operand in an incrementable counter, said read-only mode RAM being operable by said device in the presence of detectable bit failures comprising the steps of:

(a) storing a sequence of N simple parity-coded words of an executable program in a first range of N consecutive addresses in said read-only mode RAM;

(b) storing at least one image copy of the sequence in a second range of N consecutive addresses in said read-only nonintersecting and symmetric with the first range, the most significant address digit (MSD) of the addresses in the second range being the Boolean complement of the MSD of the addresses in the first range;

(c) responsive to the operand in the counter being incremented, copying the codeword at the location defined by the operand into a memory register and ascertaining the parity condition of said copied word;

(d) in the absence of a parity error, incrementing the counter by a predetermined magnitude to another location in the first address range, and writing out the contents of said memory register to the program-executing device and repeating steps (b) and (c) serially until program termination;

(e) in the presence of parity error, inhibiting change of the operand in the counter, inhibiting writing out of the memory register contents, logically combining the parity error indication with the MSD of the operand in the counter and accessing the codeword at a mirror address defined by the modified operand in the second range of addresses, and writing said accessed codeword over the contents of the memory register and repeating steps (b) and (c) in the second range of addresses serially until either a parity error is detected or program termination.

7. The method according to claim 6, wherein in step (d) the address of the next word after accessing the word at the location defined by the modified operand is an address selected from the set consisting of j+ a predetermined increment in the first address range or nj+ a predetermined increment in the second address range.

8. The method according to claim 6, wherein the step of logically combining the parity error indication and the MSD is one selected from the set consisting of logical "OR", exclusive "OR", and a logical "AND".

9. The method according to claim 6, wherein the N words constituting the executable program are stored in consecutive locations in memory in the first address range from a, a+1, a+2, . . . , a+N−1, and wherein the step (a) of storing at least one image copy of the executable program further includes the step of storing the N words constituting said image copy in the second address and symmetric range b, b+1, b+2, . . . , b+N−1, said second address range being mutually exclusive of the first such that $$a<(a+1)<\ldots<(a+N-1)<b<(b+1)<\ldots<(b+N-1).$$

10. A control storage device for use with a program-executing device in placing said program-executing device in a predetermined operating state in transitioning from a power-down state to a power-up state even in the presence of detectable memory error, erasure, or fault comprising:

a nonvolatile, random-accessible memory of capacity of at least 2N words and operable in a read-only manner, said memory intercoupling an address decoder and a register into which a word accessed from the memory is copied, said memory storing an N simple parity-encoded word sequence of an executable program among consecutive addresses in a first address range and an image copy of said program among consecutive addresses in a second address range mutually exclusive of and nonintersecting with the first address range;

an incrementable k digit address counter coupling said decoder over k parallel paths for accessing said memory; and a parity error-switchable address modification arrangement responsive to detectable parity error in the current word in the memory register for inhibiting any change in the address counter, for logically combining a first Boolean value indicative of detected parity error and the most significant digit (MSD) of the k digit address currently being applied to said decoder, for accessing the word at the location defined by the modified address, for copying it to the memory register and testing its parity condition, for writing said word out to the program-executing device if error free, setting the counter to the address range defined by the current modified memory address, for incrementing the counter by a predetermined amount in the address range, and for repeating said operations serially to either a parity error switch address in the other address range or to program termination.

11. The control storage device according to claim 10, wherein the address modification arrangement includes a logical combining circuit interposed such that the most significant digit (MSD) path of the k digit address paths from the counter operates as first input and a parity detection circuit operates as a second input.

12. The control storage device according to claim 11, wherein the logical combining circuit is one selected from the set consisting of logical "OR", exclusive "OR", and a logical "AND".

13. An apparatus for managing a read-only, word-addressable memory accessed under control of a register, said memory and register coupling a program responsive computing means, said memory being operative in the presence of detectable bit failures in which a sequence of N simple parity-coded words of an initial program load (IPL) are stored in a first range of memory addresses, said sequence of codewords being accessed responsive to a succession of operands applied to the register, said apparatus comprising:

(a) means for storing at least one image of the IPL in a second range of addresses mutually exclusive of and symmetric with the first range;

(b) means responsive to each operand being applied to the register for copying the codeword at the location defined by the operand and for ascertaining the parity condition of said copied word;

(c) means in the absence of a parity error for incrementing the register by a predetermined magnitude to another location in the first address range and repeating the word access and parity testing serially until either parity error detection or program termination; and (d) means in the presence of parity error for modifying the register operand utilizing the parity error indication and for accessing the codeword at a mirror address defined by the modified operand in the second range of addresses, and for causing the memory accessing traverse to be continued in the switched-to address range until either another parity error is detected or the accessing traverse of the IPL from the memory is completed.

14. The apparatus according to claim 13, wherein the addresses are expressed as binary numbers, further wherein the first and second range of addresses are mirrored in that they are binarily symmetric with each other, and wherein the means for modifying the register operand utilizing the parity error indication further includes means for logically combining the most significant binary digit (MSD) of the operand in the register and the parity error indication, thereby causing access to be made of the mirrored location in the other address range.

15. The apparatus according to claim 14, wherein the logical combining means are selected from a set consisting of means effectuating a logical "OR", an exclusive "OR", and a logical "AND".

16. In a system for establishing a path to data on a cyclic, tracked disk storage medium and including means for either recording data or for reading data from the disk medium, said system further comprising a programmable controller for the disk medium and a read-only control store having a capacity for at least 2N words, wherein said control store includes a random-accessible, read-only memory having a sequence of N simple parity-encoded words of an initial program load (IPL) in a first range of consecutive addresses within the memory and an image copy of said IPL at a second range of consecutive addresses mutually exclusive of and nonintersecting with the first address range; and wherein said control store further includes mean for detecting parity error each time a word is accessed from the memory at any point in its current access traverse in the first address range; and means responsive to detected parity error for switching the accessing traverse through the IPL in memory between the IPL in the first address range and its image copy in the second address range, a traverse continuing within the switched-to address range either until another detected parity error causes the traverse to be switched to the other address range or the program access terminates.

* * * * *